(12) United States Patent
Agarwal et al.

(10) Patent No.: US 10,586,305 B2
(45) Date of Patent: Mar. 10, 2020

(54) SYSTEMS AND METHODS FOR SHAPE CONSTRAINED 3D POINT CLOUD REGISTRATION

(71) Applicant: Tata Consultancy Services Limited, Mumbai (IN)

(72) Inventors: Swapna Agarwal, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 56 days.

(21) Appl. No.: 15/872,557

(22) Filed: Jan. 16, 2018

(65) Prior Publication Data

US 2019/0073744 A1    Mar. 7, 2019

(30) Foreign Application Priority Data

Sep. 1, 2017   (IN) .............................. 201721031135

(51) Int. Cl.
| | |
|---|---|
| *G06K 9/00* | (2006.01) |
| *G06K 9/46* | (2006.01) |
| *G06K 9/62* | (2006.01) |
| *G06T 3/00* | (2006.01) |
| *G06T 7/30* | (2017.01) |

(Continued)

(52) U.S. Cl.
CPC .............. *G06T 3/0075* (2013.01); *G06T 7/30* (2017.01); *G06T 7/32* (2017.01); *G06T 7/337* (2017.01); *G06T 7/37* (2017.01); *G06T 2207/10028* (2013.01); *G06T 2207/20016* (2013.01)

(58) Field of Classification Search
USPC ................. 382/154, 103, 201, 209; 345/419
See application file for complete search history.

(56) References Cited

U.S. PATENT DOCUMENTS

| 9,625,253 | B2 * | 4/2017 | Stewart ..................... G06T 7/75 |
| 2006/0038812 | A1 * | 2/2006 | Warn ....................... G06T 19/20 |
| | | | 345/419 |

(Continued)

OTHER PUBLICATIONS

Agarwal et al, "3D Point Cloud Registration With Shape Constraint", 2019, embedded system and robotics, TCS REasearch and innovation, india, pp. 1-5 (Year: 2019).*

(Continued)

*Primary Examiner* — Kathleen Y Dulaney
(74) *Attorney, Agent, or Firm* — Finnegan, Henderson, Farabow, Garrett & Dunner LLP

(57) ABSTRACT

Systems and methods of the present disclosure facilitate rigid point cloud registration with characteristics including shape constraint, translation proportional to distance and spatial point-set distribution model for handling scale. The method of the present disclosure enables registration of a rigid template point cloud to a given reference point cloud. Shape-constrained gravitation, as induced by the reference point cloud, controls movement of the template point cloud such that at each iteration, the template point cloud better aligns with the reference point cloud in terms of shape. This enables alignment in difficult conditions introduced by change such as presence of outliers and/or missing parts, translation, rotation and scaling. Also, systems and methods of the present disclosure provide an automated method as against conventional methods that depended on manually adjusted parameters.

13 Claims, 9 Drawing Sheets

(51) Int. Cl.
*G06T 7/32* (2017.01)
*G06T 7/33* (2017.01)
*G06T 7/37* (2017.01)

(56) References Cited

U.S. PATENT DOCUMENTS

| 2015/0138185 | A1* | 5/2015 | Huang | G06T 17/00 |
| | | | | 345/419 |
| 2016/0199135 | A1* | 7/2016 | Koch | A61B 5/02028 |
| | | | | 600/407 |
| 2017/0372488 | A1* | 12/2017 | Brown | G06T 7/50 |
| 2018/0104898 | A1* | 4/2018 | Lameris | B29C 64/20 |

OTHER PUBLICATIONS

Ramos et al,"A vectorized principal component approach for solving the data registration problem", 2006 IEEE conference on Decision and control, pp. 1297-1302 (Year: 2006).*

Vaiapury et al "Can we speed up 3D scanning? A cognitive and geometric analysis", 2017 ICCV Worrkshop, pp. 2690-2696 ( Year: 2017).*

Golyanik, V. et al. "Gravitational Approach for Point Set Registration," *2016 IEEE Conference on Computer Vision and Pattern Recognition (CVPR)*, Jun. 27-30, 2016, Las Vegas, NV; pp. 5802-5810.

Huang, X. et al. (Apr. 2017). "A Systematic Approach for Cross-source Point Cloud Registration by Preserving Macro and Micro Structures," *IEEE Transactions on Image Processing*, vol. 26, No. 7; pp. 1-14.

Peng, L. et al. (Feb. 2016). "Robust CPD Algorithm for Non-Rigid Point Set Registration Based on Structure Information," *PLoS One*, vol. 11, No. 2; 15 pages.

Simon, D. (1996). Fast and Accurate Shape-Based Registration (Doctoral dissertation). Retrieved from http://www.ri.cmu.edu/pub_files/pub1/simon_david_1996_1/simon_david_1996_1.pdf.

Pomerleau, F. et al. (May 2015). "A Review of Point Cloud Registration Algorithms for Mobile Robotics," *Journal Foundations and Trends in Robotics*, vol. 4, No. 1; pp. 1-104.

* cited by examiner

SYSTEMS AND METHODS FOR SHAPE CONSTRAINED 3D POINT CLOUD REGISTRATION

PRIORITY CLAIM

This U.S. patent application claims priority under 35 U.S.C. § 119 to: Indian Patent Application No. 201721031135, filed on 1 Sep. 2017. The entire contents of the aforementioned application are incorporated herein by reference.

TECHNICAL FIELD

The embodiments herein generally relate to registration of point cloud data and more particularly to systems and methods for shape constrained rigid registration of 3D point-cloud.

BACKGROUND

With increasing availability of 3 Dimensional (3D) data acquisition devices such as Kinect™, researchers are inclining towards exploiting 3D information for a variety of applications such as change detection in a scene, industrial quality control, pose tracking, and the like. Registration of 3D point clouds is a critical initial step for many associated processes. Generally, two point clouds, referred to as reference point cloud and template point cloud respectively of an object or scene are captured at two time instances, possibly from different camera positions. The scene may have undergone some changes during this time interval. Registration refers to the process of translating, rotating and scaling the template such that it optimally aligns with the reference. Noise, outliers and missing parts are challenges to be addressed during registration.

SUMMARY

Embodiments of the present disclosure present technological improvements as solutions to one or more of the above-mentioned technical problems recognized by the inventors in conventional systems.

In an aspect, there is provided a processor implemented method comprising: capturing a reference point cloud and a template point cloud and automatically performing rigid registration of the reference point cloud and the template point cloud, wherein the rigid registration firstly comprises embedding a shape-based similarity constraint into a Gravitational Approach (GA), wherein curvature is used for representation of shape. This step is followed by iteratively performing, for varying levels of resolution of the reference point cloud and the template point cloud, obtaining total force applied on a point of the template point cloud by all points on the reference point cloud; computing translation of the template point cloud based on the obtained total force to obtain new position of the template point cloud with respect to the reference point cloud; estimating rotation required for registration based on the new position of each point of the template point cloud; and estimating scaling required for registration based on a ratio of eigenvalues of co-variance matrices associated with the reference point cloud and the template point cloud.

In another aspect, there is provided a system comprising: one or more data storage devices operatively coupled to the one or more processors and configured to store instructions configured for execution by the one or more processors to: capture a reference point cloud and a template point cloud; and automatically perform rigid registration of the reference point cloud and the template point cloud by: embedding a shape-based similarity constraint into a Gravitational Approach (GA), wherein curvature is used for representation of shape; and iteratively performing: obtaining total force applied on a point of the template point cloud by all points on the reference point cloud; computing translation of the template point cloud based on the obtained total force to obtain new position of the template point cloud with respect to the reference point cloud; estimating rotation required for registration based on the new position of each point of the template point cloud; and estimating scaling required for registration based on a ratio of eigenvalues of co-variance matrices associated with the reference point cloud and template point cloud.

In yet another aspect, there is provided a computer program product comprising a non-transitory computer readable medium having a computer readable program embodied therein, wherein the computer readable program, when executed on a computing device, causes the computing device to: capture a reference point cloud and a template point cloud; and automatically perform rigid registration of the reference point cloud and the template point cloud by: embedding a shape-based similarity constraint into a Gravitational Approach (GA), wherein curvature is used for representation of shape; and iteratively performing: obtaining total force applied on a point of the template point cloud by all points on the reference point cloud; computing translation of the template point cloud based on the obtained total force to obtain new position of the template point cloud with respect to the reference point cloud; estimating rotation required for registration based on the new position of each point of the template point cloud; and estimating scaling required for registration based on a ratio of eigenvalues of co-variance matrices associated with the reference point cloud and template point cloud.

In an embodiment of the present disclosure, the one or more hardware processors are further configured to embed a shape-based similarity constraint into the Gravitational Approach (GA) by: constraining force of attraction on each point of the template from each point of the reference with a measurement of local shape similarity; modifying the force of attraction on each point of the template point cloud such that the modified force of attraction is directly proportional to a monotonically increasing function of distance therebetween; and modifying the force of attraction on each point of the template point cloud such that the modified force of attraction is directly proportional to a function of shape similarity.

In an embodiment of the present disclosure, the one or more hardware processors are further configured to obtain total force applied on a point of the template point cloud based on (i) a function g of shape similarity configured to provide weightage to non-planar local shapes compared to planar shapes; and (ii) a function h of distance between the reference point cloud and the template point cloud configured to control acceleration and convergence of alignment for the rigid registration.

In an embodiment of the present disclosure, the one or more hardware processors are further configured to estimate rotation required for the rigid registration based on Kabsch method.

In an embodiment of the present disclosure, the one or more hardware processors are further configured to automatically perform the rigid registration iteratively based on a pyramidal approach.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
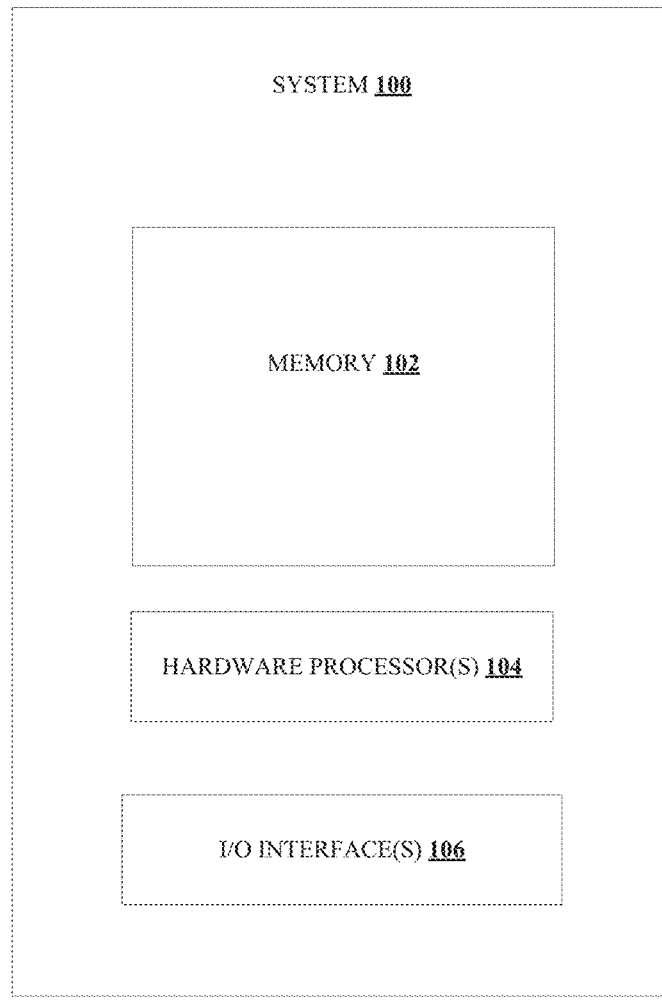
FIG. 1 illustrates an exemplary block diagram of a system for shape constrained 3D point cloud registration, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Several methods have been used for rigid point cloud or point set registration. One of the earliest methods for rigid point set registration is Iterative Closest Point (ICP). Using non-linear optimization algorithm, ICP minimizes the mean squared distances between the two point sets. Though this method is simple to implement, it is sensitive to outliers and the performance depends on the initial alignment. While ICP assigns discrete correspondences between the points of the two sets, later methods such as Robust Point Matching (RPM) assign soft correspondences. Further, there have been methods that treat registration problem as maximum likelihood estimation problem where the template points are assumed to be the centroids of Gaussian Mixture Model (GMM) and the reference points are seen as data points. Expectation-Maximization (EM) algorithm is generally used for optimization of likelihood function. A closed form solution to the M-step of the EM algorithm for multidimensional case is the Coherent Point Drift (CPD). The GMM based methods perform better in presence of noise. CPD was refined subsequently for structured outliers. In the Gravitational Approach (GA) based registration algorithm, the template moves towards the reference under the influence of gravitational force as induced by the reference. GA based method is shown to perform better compared to CPD under more than 50% uniform noise. The performance of GA however decreases with increasing rotation (more than 45°) and change (additional parts or missing parts). Again, seven free manually adjusted parameters formed an integral part of GA based registration method including:

1. G: Gravitational constant
2. ε: A threshold distance beyond which the gravitational interaction does not increase severely.
3. η: Proportional constant in defining the dissipation term. The dissipation term represents a force in the direction opposite to the velocity of the template point cloud with a magnitude proportional to its speed.
4. $v^{Y_i}$: velocity of Yi
5. ρE: Error tolerance in the GA based registration algorithm
6. Δt: Time unit
7. K: Number of iterations Systems and methods of the present disclosure focus on automatic rigid registration of 3D point-clouds with no dependency on color, texture, point correspondence or point topology information of the point-clouds. Also, the method of the present disclosure is fully automated with no dependency on any manually adjusted free parameters as in the case of the GA based registration. A shape-constrained iterative method is provided to register a rigid template point cloud to a given reference point cloud. In the context of the present disclosure, the point cloud may be interchangeably referred as point set. The method embeds a shape-based similarity constraint into the principle of gravitation. The shape-constrained gravitation, as induced by the reference point cloud, controls movement of the template point cloud such that at each iteration, the template point cloud aligns better with the reference point cloud in terms of shape. This constraint enables alignment in difficult conditions introduced by change (presence of outliers and/or missing parts), translation, rotation and scaling.

Referring now to the drawings, and more particularly to FIGS. 1 through 8, where similar reference characters denote corresponding features consistently throughout the figures, there are shown preferred embodiments and these embodiments are described in the context of the following exemplary system and method.

FIG. 1 illustrates an exemplary block diagram of a system 100 for shape constrained 3D point cloud registration, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 comprises one or more data storage devices or memory 102 operatively coupled to the one or more processors 104 and is configured to store instructions configured for execution of steps of the method 200 by the one or more processors 104.

Figure 2:
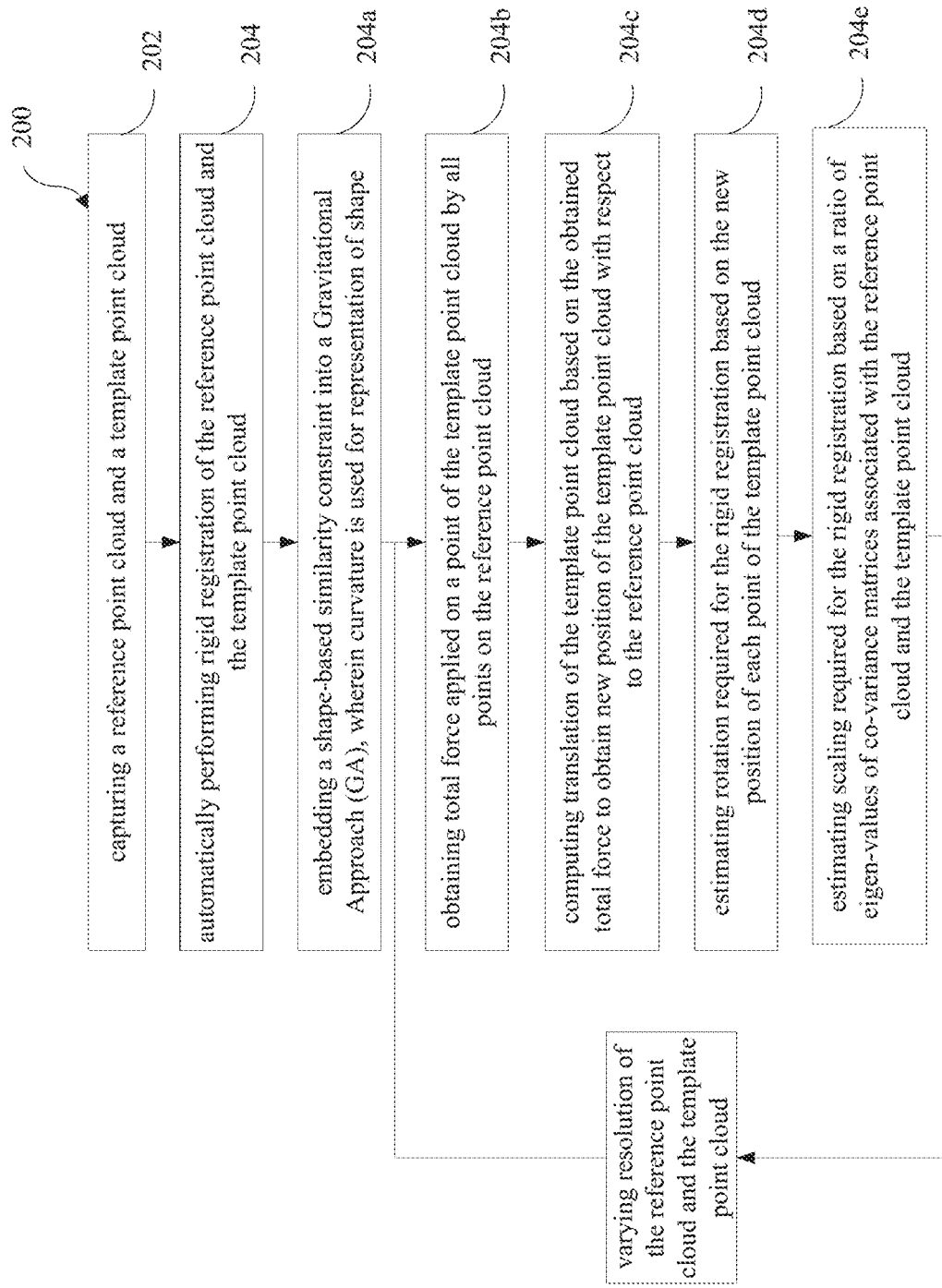
FIG. 2 is an exemplary flow diagram illustrating a computer implemented method for shape constrained 3D point cloud registration, in accordance with an embodiment of the present disclosure.

FIG. 2 is an exemplary flow diagram illustrating a computer implemented method for shape constrained 3D point cloud registration, in accordance with an embodiment of the present disclosure. The steps of the method 200 will now be explained in detail with reference to the components of the system 100 of FIG. 1.

In accordance with an embodiment of the present disclosure, the one or more processors 104 are configured to capture, at step 202, a reference point cloud and a template point cloud.

In the Gravitational Approach (GA) based registration, each point in the reference point cloud attracts each point in the template point cloud. The force of attraction is governed by the following formula—

$$f^{Yi} = Gm^{Yi} \sum_{j=1}^{N} \frac{m^{Xj}}{(\|r^{Yi} - r^{Xj}\|^2 + \varepsilon^2)^{3/2}} n_{ij} - \eta v^{Yi} \quad \rightarrow (1)$$

In equation (1), G is the gravitational constant and $f^{Yi}$ represents total force applied on a point Yi of the template point cloud. The symbols Xj, $m^{Xj}$, $r^{Xj}$, and N represent the $j^{th}$ point in the reference point cloud, mass of Xj, absolute coordinates of $X_j$ and number of points in the reference respectively. The symbols $n_{ij}$, $v^{Yi}$ and $\eta$ represent a unit vector in the direction of force, the velocity of Yi in the previous iteration and a constant respectively. The template point cloud, as a rigid body, gets displaced in an iterative way under the influence of the cumulative force induced by all the points in the reference. The term $\varepsilon^2$ does not allow the force to increase beyond a certain small distance between the reference point cloud and the template point cloud (note that $$f^{Yi} \propto \frac{1}{\|r^{Yi} - r^{Xj}\|^2}.$$

The term $-\eta v^{Yi}$ in equation (1) acts as friction that controls the velocity near local minima. Given the force, the displacement of the template point cloud is estimated following Newton's second law of motion. The scale and rotation, required for registration are estimated using the new positions of the points in the template point cloud which are estimated following equation (1).

Figure 3:
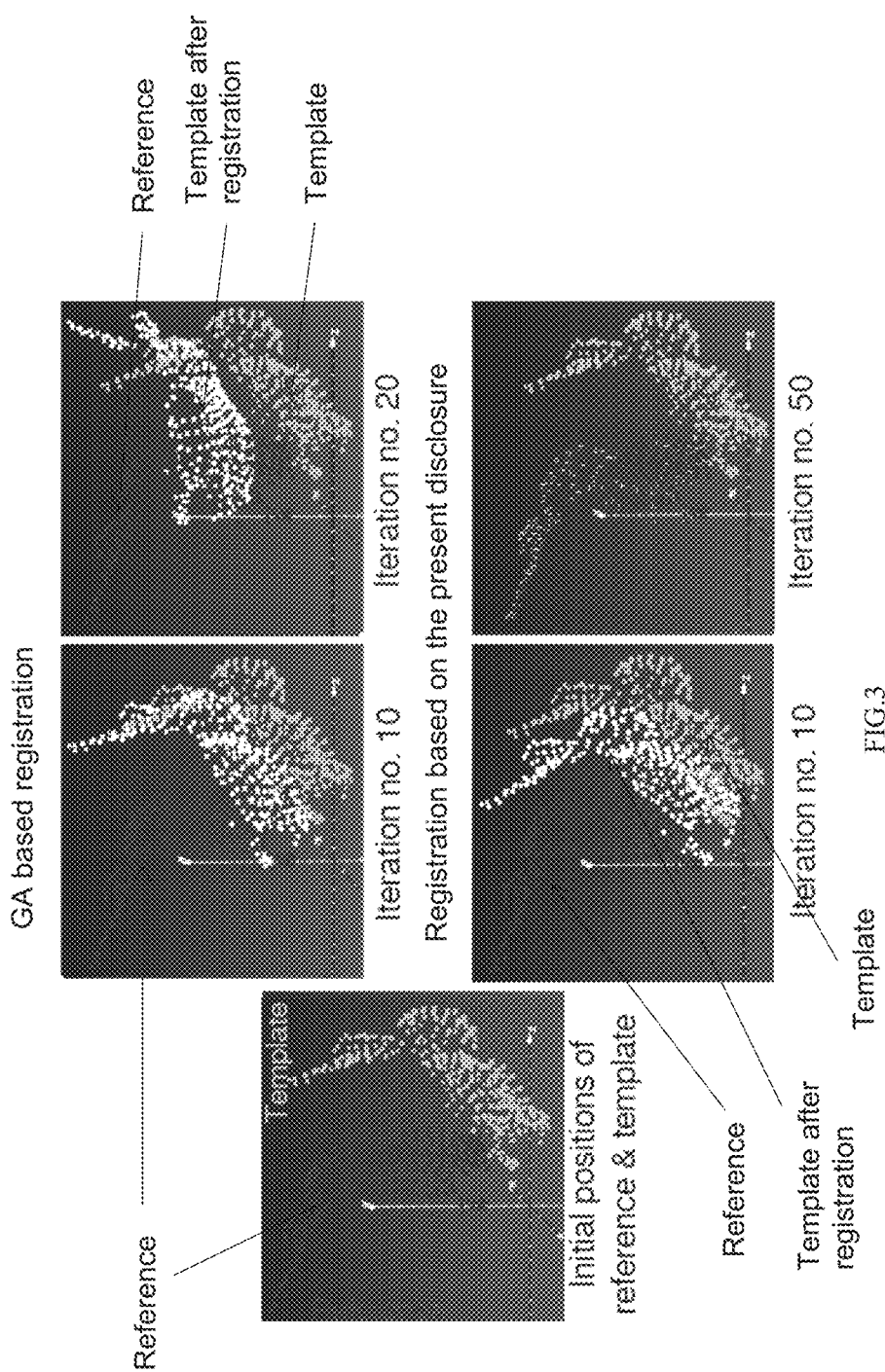
FIG. 3 illustrates a comparison of registration results of the gravitational approach vis-à-vis a method in accordance with an embodiment of the present disclosure.

The objective of the gravitational force is to minimize the distance between the center-of-mass of the two objects (reference point cloud and the template point cloud). On the other hand, the objective of registration is to align the two objects such that the parts of the objects having similar shapes map to each other. This conflict of objectives results in misalignment as seen in FIG. 3 wherein a comparison of registration results of the gravitational approach vis-à-vis a method in accordance with an embodiment of the present disclosure is illustrated. The frontal view of the bunny data shows that lower body part of the bunny is heavier compared to the head. In GA, the heavier parts of the template point cloud get attracted more by the reference point cloud, irrespective of shape, resulting in misalignment (first row). In accordance with the method of the present disclosure, the parts of the template point cloud get attracted by the parts of the reference point cloud having similar shape. This gives better alignment even in presence of large rotation. In the example illustration of FIG. 3, the template point cloud is given a 50° rotation with respect to the x-axis. The present disclosure therefore modifies the principles of gravitation to accommodate the shape constraint. Accordingly, in accordance with the present disclosure, the one or more processors 104 are configured to automatically perform rigid registration of the reference point cloud and the template point cloud, at step 204, by firstly embedding a shape-based similarity constraint into a Gravitational Approach (GA), wherein curvature is used for representation of shape, referenced as step 204a.

In GA, $f^{Yi} \propto m^{Xj} m^{Yi}$. As a result, in registration following equation (1), the heavier parts of the point-clouds attract each other more irrespective of the shape, resulting in misalignment as illustrated in FIG. 2 (top row). Therefore, in accordance with the present disclosure, equation (1) is modified such that force of attraction on each point of the template point cloud from each point of the reference point cloud is constrained with a measurement of local shape similarity, $$f^{Yi} \propto g(s^{Xj,Yi}) \quad \rightarrow (2)$$

where, $s^{Xj,Yi}$ represents a measure of shape similarity of local neighborhood centered at Xj and Yi respectively. g is a function of shape similarity s; and g is defined such that it gives preference to non-planar shape as compared to planar shape. In accordance with the present disclosure, features such as histogram of normals, coefficients of polynomial approximating the local surface, curvature, and the like that can represent shape in spatially local domain have been evaluated. In accordance with the present disclosure, the curvature is the best representative of local shape. As a similarity measure of shape, a Radial Basis Function (RBF) may be used where the output decreases monotonically as the dissimilarity increases. Accordingly, $$s^{Xj,Yi} = \exp\left(-\frac{|a^{Xj} - a^{Yi}|^2}{\sigma^2}\right) \rightarrow (3)$$

where, |•| represents absolute value, σ and $a^{Xj}$ represent spread of the RBF function and curvature value of the neighborhood centered at Xj. In accordance with the present disclosure, the template point cloud makes a large movement if the distance between the template point cloud and the reference point cloud is large. In order to cover the large distance, in accordance with the present disclosure, the template point cloud makes tiny advancements towards the reference point cloud when close to alignment. This is ensured in the method of the present disclosure by modifying the force of attraction on each point of the template point cloud such that the modified force of attraction is directly proportional to a monotonically increasing function of distance therebetween represented by the following formula—

$$f^{Yi} \alpha h(r^{Yi} - r^{Xj}) \rightarrow (4)$$

Figure 4:
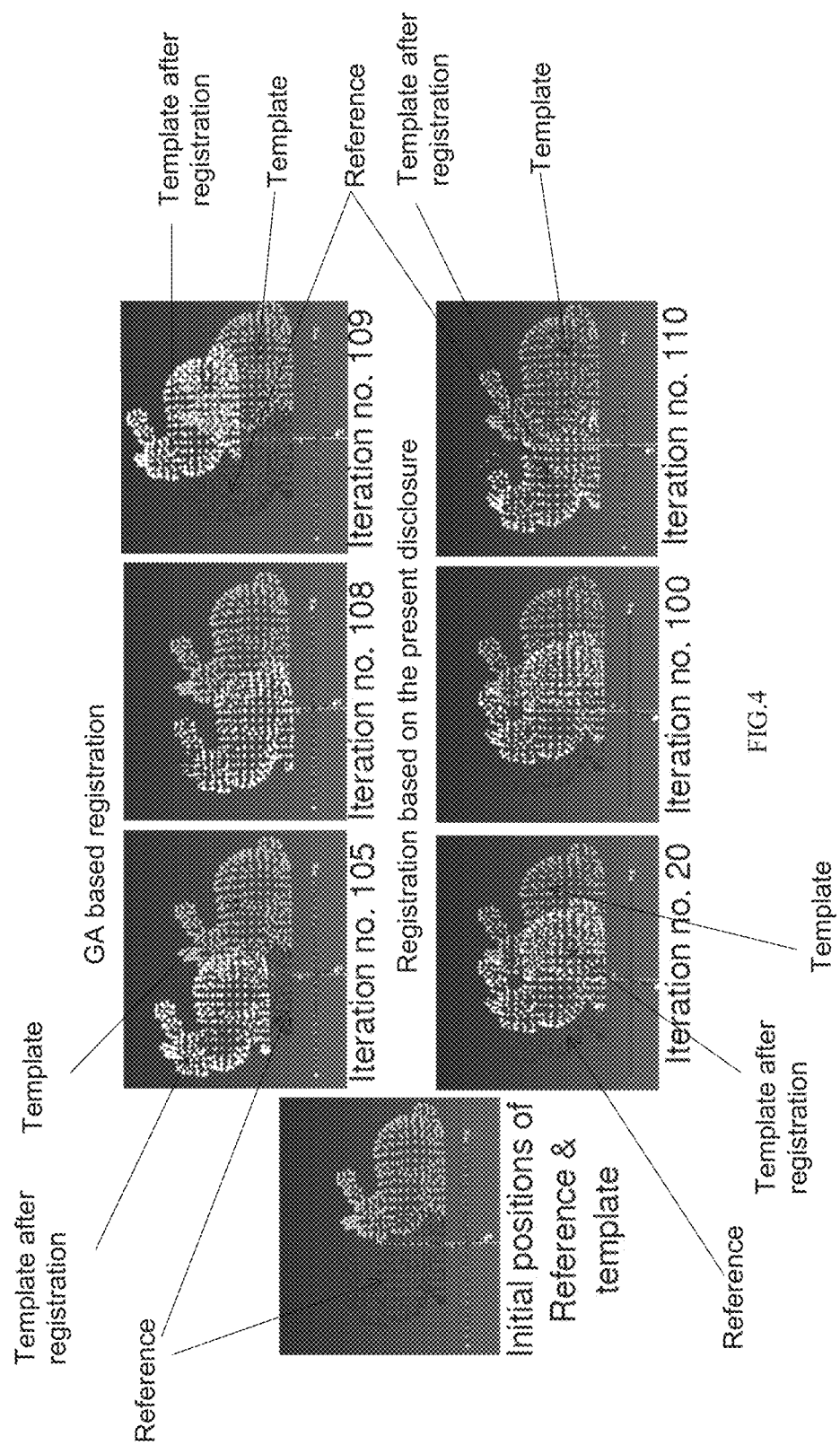
FIG. 4 illustrates a comparison of iterative alignment results of the gravitational approach vis-à-vis a method in accordance with an embodiment of the present disclosure.

FIG. 4 illustrates a comparison of iterative alignment results of the gravitational approach vis-à-vis a method in accordance with an embodiment of the present disclosure. The method of the present disclosure approaches local minima very fast (20 vs. 105 iterations in the second column). Near local minima, the method of the present disclosure takes smaller steps while GA overshoots (third to fourth columns).

The value of the function g in equation (2) or the function h in equation (4) may be the value of the argument itself or a suitable function as discussed herein below. Therefore, in accordance with an embodiment of the present disclosure, the one or more processors 104 are configured to obtain, at step 204b, total force applied on a point Yi of the template point cloud by all points on the reference point cloud based on the following formula:

$$f^{Yi} = -G\sum_{j=1}^{N} g(s^{Xj,Yi})h(r^{Yi} - r^{Xj})n_{ij} \rightarrow (5)$$

As seen from equation 5 of the present disclosure, free parameters ε and η of equation (1) of GA based registration are eliminated.

Further, in accordance with an embodiment of the present disclosure, the one or more processors 104 are configured to compute, at step 204c, translation of the template point cloud based on the obtained total force to obtain new position of the template point cloud with respect to the reference point cloud. Translation or displacement, represented by say, d, of the template point cloud, may be represented by following Newton's second law of motion as:

$$d = \left(\frac{f}{m^x}\text{time} + v^x\right) \times \text{time} \rightarrow (6)$$

In equation (6), f, $m^x$ and $v^x$ represent the total force $$\left(\sum_{i}^{M} f^{Yi}\right)$$

applied on the template point cloud X, mass of X and velocity of X in a previous iteration respectively.

Further, in accordance with an embodiment of the present disclosure, the one or more processors 104 are configured to estimate, at step 204d, rotation required for the rigid registration based on the new position of each point of the template point cloud. In an embodiment, rotation matrix R is estimated based on the Kabsch algorithm. Let Y and $Y_D$ represent the mean subtracted M×3 matrices representing M coordinates of the template point cloud before and after translation following equation 6. Let $\hat{C}=Y_D^T Y$ represent a cross-covariance matrix. In an embodiment, the rotation matrix R is estimated using Singular Value Decomposition (SVD) of $\hat{C}$. After SVD $\hat{C}=\hat{U}\hat{S}\hat{V}^T$ and let $\acute{s}=\text{sign}(\det(\hat{V}\hat{U}^T))$. Then, $$R = \hat{V}\begin{bmatrix} 1 & 0 & 0 \\ 0 & 1 & 0 \\ 0 & 0 & \acute{s} \end{bmatrix}\hat{U}^T \rightarrow (7)$$

Again, in accordance with an embodiment of the present disclosure, the one or more processors 104 are configured to estimate, at step 204e, scaling required for the rigid registration based on a ratio of eigenvalues of co-variance matrices associated with the reference point cloud and the template point cloud as explained hereinafter. In GA, the scale is estimated as the ratio of the positions estimated using equation (1) and previous positions of the points in the template point cloud. Any error occurring in estimating the translation using equation (1) gets propagated to estimating the scale at each iteration of GA based registration. The method of the present disclosure does not depend on estimation of translation. The eigenvalues of the covariance matrix (say C) of each of the two point-clouds are computed. The largest eigenvalue represents a measure of the length of the point cloud distribution in the direction of the largest variance. This measurement is independent of the orientation or relative position of the two point clouds. Using SVD, it is noted that $C=USV^T$, where diagonal elements of S represent the eigenvalues and U and V are orthogonal matrices. The scale is estimated as $$c = \frac{eX}{eY}$$

where eX and eY are the largest eigenvalues of the reference and the template point clouds respectively. In accordance with the present disclosure, the template point cloud (Y) is scaled as—

$$\hat{Y}=V \text{ diag}(c)V^T Y^T(t) \rightarrow (8)$$

wherein, t stands for iteration number and diag(c) represents a square matrix with c in the diagonal and zeros elsewhere. In each iteration of the method of the present disclosure, the template cloud point is updated using $$Y(t+1)=\hat{Y}R+\mu+d \rightarrow (9)$$

wherein, μ is a M×3 matrix where each row represents mean position of the template point cloud.

In accordance with the present disclosure, the step of obtaining total force applied on a point of the template point cloud is based on (i) a function g of shape similarity configured to provide weightage to non-planar local shapes compared to planar shapes; and (ii) a function h of distance between the reference point cloud and the template point cloud configured to control acceleration and convergence of alignment for the rigid registration as explained hereinafter.

In accordance with the present disclosure, the value of shape similarity $g(s^{\bar{x}j,\bar{n}})$ is the main factor controlling the translation and rotation of the template. If equal weightage is given to all local shapes then $g(s^{\bar{x}j,\bar{n}})=s^{\bar{x}j,\bar{n}}$. In indoor and some outdoor scenes non-planar local shapes play vital role in registration compared to planar shape. Therefore, in accordance with the present disclosure, g may be set as follows to give weightage to non-planar local shapes.

$$g(s^{\bar{x}j,\bar{n}})=\alpha^{\bar{x}j}\alpha^{\bar{n}}s^{\bar{x}j,\bar{n}} \rightarrow (10)$$

In accordance with the present disclosure, setting the radius of the local neighborhood to $\sqrt{eX}$ and $\sqrt{eY}$ respectively yields good results for finding the curvature a. In accordance with the present disclosure, h of equation (4) is designed as follows—

$$h(r^{\bar{n}}-r^{\bar{x}j})=(|r^{\bar{n}}-r^{\bar{x}j}|)^p, \text{ where } p\geq 1 \text{ and } |\cdot| \text{ represents an absolute value} \rightarrow (11)$$

Higher value of p results in greater speed but oscillation about the local minimal. Lower value of p results in better registration but makes the process slow. The mass m of every point is assumed to be 1 and velocity $v^x$ is set to 0. m and $v^x$ may be modified depending on prior information, if any. In accordance with the present disclosure, it is also suggested that G of equation 5 should take larger values near convergence when the method of the present disclosure takes smaller steps. Accordingly, G is modified as follows.

$$G(t+1)=0.1\times G1+0.9\times G1/(1+\exp[-\{t-E/2\}]) \rightarrow (12)$$

where, G1 is set as 10000 and E=400 is the number of iterations. For noisy real world scenarios, pyramidal approach (coarse to fine iterative strategy) may be employed where the size of the local neighborhood and σ of equation (3) decreases with iteration.

Figure 5:
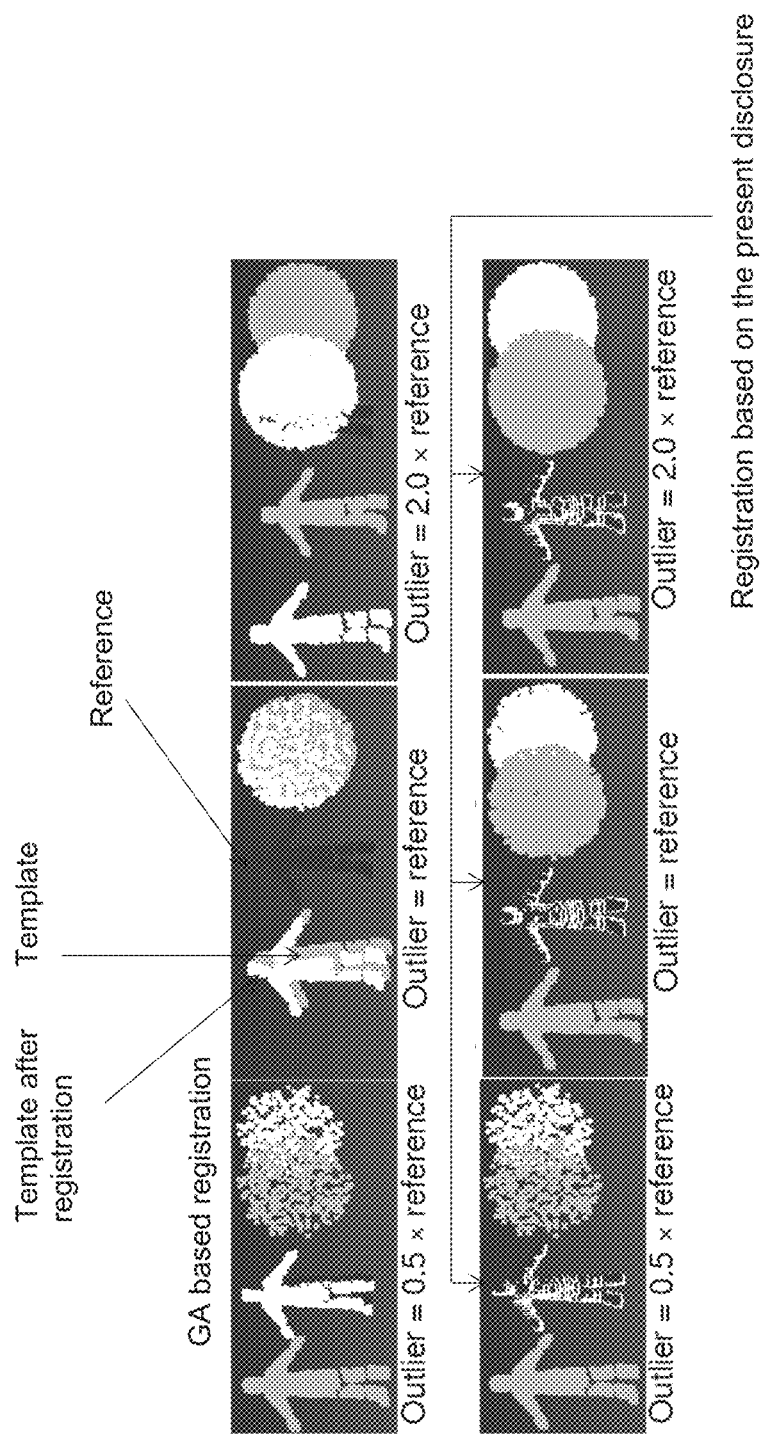
FIG. 5 illustrates a comparison of registration results of the gravitational approach vis-à-vis a method in accordance with an embodiment of the present disclosure in presence of structured outliers.

Experimental Data:

On Synthetic Data:

The performance of the method of the present disclosure was evaluated on data with different amounts and types of noise (structured and unstructured outliers, missing data). FIG. 5 illustrates a comparison of registration results of the gravitational approach vis-à-vis a method in accordance with an embodiment of the present disclosure in presence of structured outliers. When the mass (no. of points) in the outliers is less than the reference point cloud (human scan), both the methods work well (FIG. 5, column 1). As the mass of the outlier increases, following GA, the outliers rather than the human shape moves towards the reference (FIG. 5, column 2, 3). In accordance with the method of the present disclosure, regardless of the mass of the outliers, the human shape in the template point cloud registers with the human shape in the reference point cloud thus indicating an advantage of the method of the present disclosure over GA. Unlike GA where the movement of the template point cloud depends on the mass, in accordance with the method of the present disclosure, the movement depends on the shape.

Figure 6B:
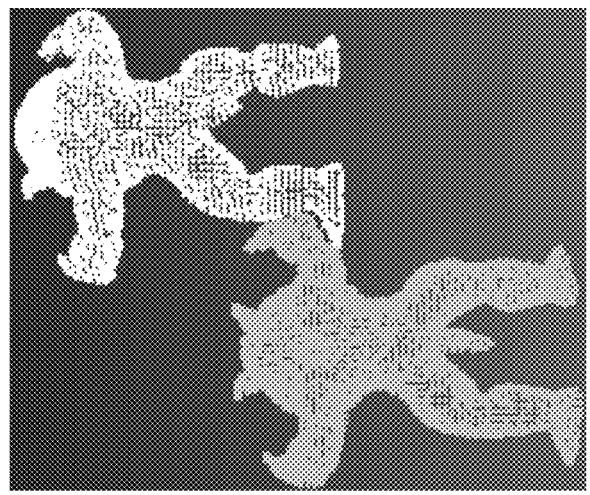
FIG. 6A through FIG. 6D illustrate registration results of the method in accordance with an embodiment of the present disclosure with 18% deleted points (a, b) and 50% outliers (c, d)
Figure 6A:
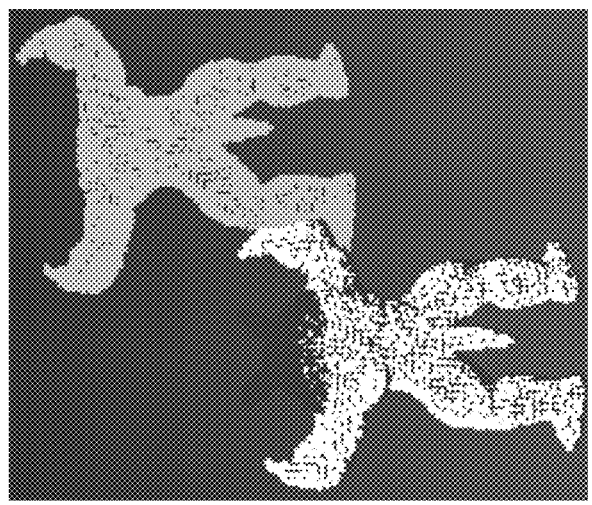
Figure 6D:
Figure 6C:
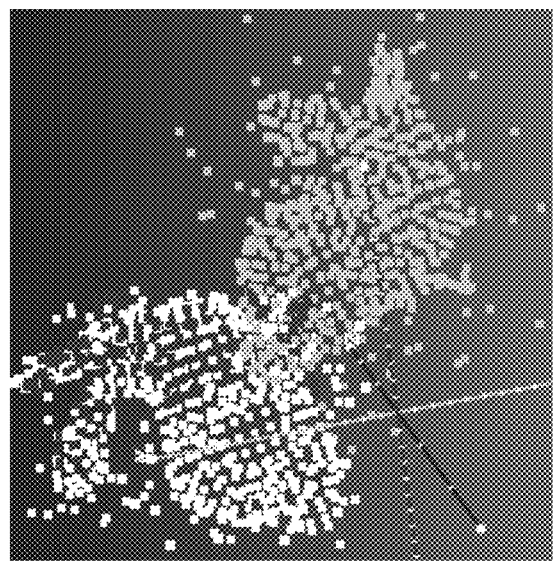

FIG. 6A through FIG. 6D illustrate registration results of the method in accordance with an embodiment of the present disclosure with 18% deleted points (FIG. 6A, FIG. 6B) and 50% outliers (FIG. 6C, FIG. 6D). In FIG. 6A through FIG. 6D, the partial cloud, original full cloud, cloud with Gaussian outlier and uniform outlier respectively are used as the template point cloud. FIG. 6A and FIG. 6B illustrate the performance of the method of the present disclosure on data with missing points by deleting 18% consecutive points from the head of Armadillo data. FIG. 6C and FIG. 6D illustrate results when 50% Gaussian and uniform outliers respectively are added to the data. 5%, 10%, 20%, 40% and 50% Gaussian and uniform noise are added to the template. For each of the 10 noise type-percentage combinations, 500 random transformations are applied on the point-cloud to form the template. The non-transformed point-cloud acts as the reference point cloud. For both the cases, when the full Armadillo or the one with missing points is used as template point cloud and the other one as the reference point cloud, the method of the present disclosure gives desired results.

Figure 7:
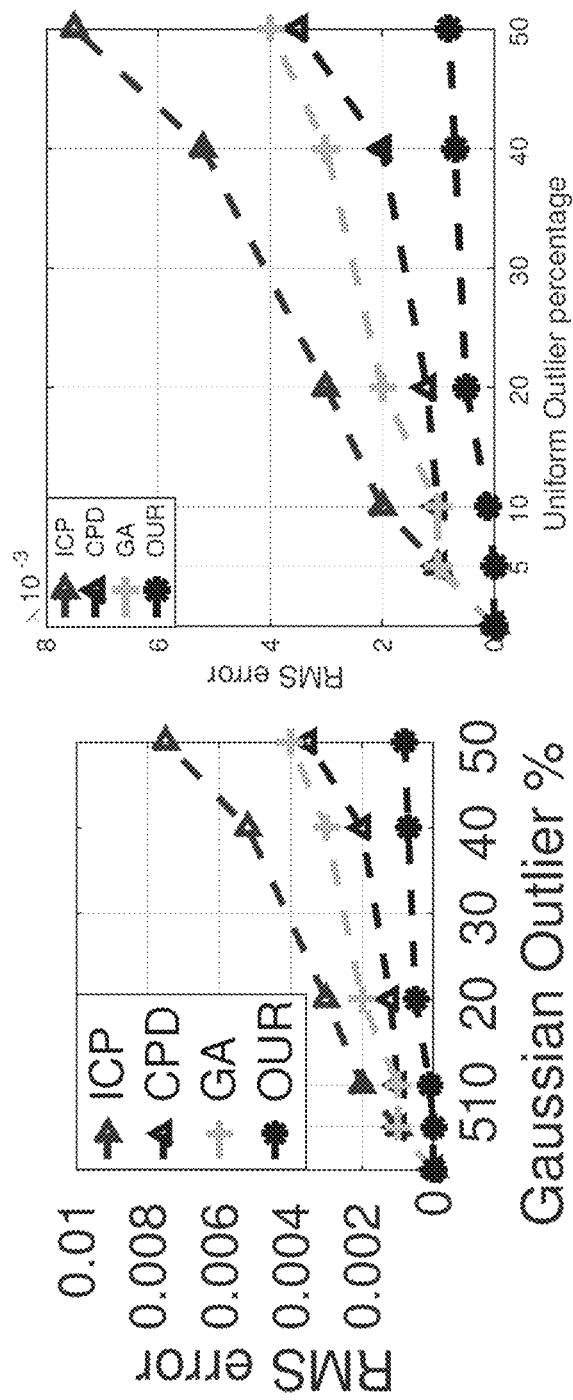
FIG. 7 illustrates a comparison of registration results of the gravitational approach (GA), Iterative Closest Point (ICP) and Coherent Point Drift (CPD), vis-à-vis a method in accordance with an embodiment of the present disclosure in presence of unstructured outliers.

FIG. 7 illustrates a comparison of registration results of the Gravitational Approach (GA), Iterative Closest Point (ICP) and Coherent Point Drift (CPD), vis-à-vis a method in accordance with an embodiment of the present disclosure in presence of unstructured outlier. FIG. 7 compares the amount of noise versus Root Mean Square Error (RMSE) for the aforementioned prior art methods with the method of the present disclosure. It is noted that all the methods perform better for Gaussian compared to uniform noise. Overall, CPD performs better compared to ICP. The method of the present disclosure outperforms all the three mentioned prior art methods.

Figure 8:
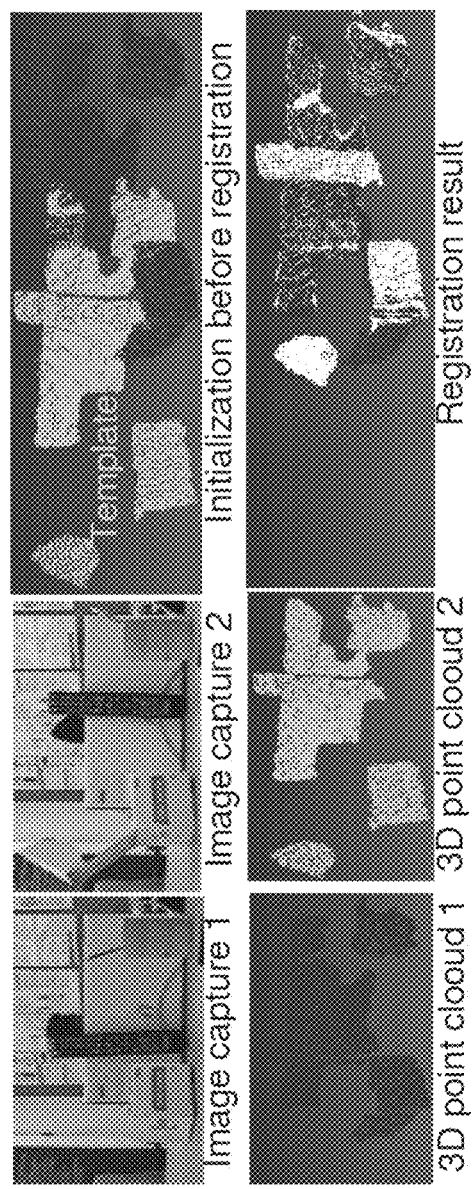
FIG. 8 illustrates registration results of the method in accordance with an embodiment of the present disclosure on a captured scene.

On Real Data:

To evaluate the method of the present disclosure in real scenarios, 3D point-cloud scans of a number of scenes are captured, wherein two captures corresponding to each scene are captured using Kinect™. FIG. 8 illustrates registration results of the method in accordance with an embodiment of the present disclosure on a captured scene. In the second capture, the position of the remote-controller has been changed and the front box has been opened. To make the problem more difficult, the template is translated by 0.2 meters along x-axis. The registration result shows proper alignment with the front box, cup and the background box. It may be noted that the cover of the front box and the remote-controller have not been aligned with anything as the position of these items have been changed. Thus, the registration approach of the present disclosure may be used for change detection in real scenes.

As discussed above, the present disclosure provides following contributions: (1) GA method minimizes the distance between the center-of-mass of the two point-clouds but does not ensure proper shape alignment (as illustrated in FIG. 3). In accordance with the present disclosure, the force of attraction is constrained with a measurement of local shape-similarly for better alignment of the shapes (i.e., handles rotation and outliers better). (2) In GA, the force of attraction is inversely proportional to the distance between the two points involved. As a result, the increased speed at local minima (where the distance is small) does not allow the algorithm to converge (as illustrated in FIG. 4). To handle this situation, a number of free parameters are introduced in GA. In accordance with the present disclosure, the force of attraction is proportional to a monotonically increasing function of distance. This modification allows for better convergence without the need for extra free parameters. (3) GA has limited capability to handle scale change. In accordance with the method of the present disclosure, to handle scale change, an orientation and translation invariant model is provided that uses the spatial point distribution of the two point-clouds. (4) The method of the present disclosure is fully automated as opposed to a number of (seven) free, manually adjusted parameters necessary in the GA based registration method.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method comprising:
   capturing a reference point cloud and a template point cloud; and
   automatically performing rigid registration of the reference point cloud and the template point cloud by:
      embedding a shape-based similarity constraint into a Gravitational Approach (GA), wherein curvature is used for representation of shape;
      iteratively performing:
         obtaining total force applied on a point of the template point cloud by all points on the reference point cloud;
         computing translation of the template point cloud based on the obtained total force to obtain new position of the template point cloud with respect to the reference point cloud;
         estimating rotation required for the rigid registration based on the new position of each point of the template point cloud; and
         estimating scaling required for the rigid registration based on a ratio of eigenvalues of co-variance matrices associated with the reference point cloud and the template point cloud.

2. The processor implemented method of claim 1, wherein embedding a shape-based similarity constraint into the GA comprises:
   constraining force of attraction on each point of the template point cloud from each point of the reference point cloud with a measurement of local shape similarity;
   modifying the force of attraction on each point of the template point cloud such that the modified force of attraction is directly proportional to a monotonically increasing function of distance therebetween; and modifying the force of attraction on each point of the template point cloud such that the modified force of attraction is directly proportional to a function of shape similarity.

3. The processor implemented method of claim 1, wherein obtaining total force applied on a point of the template point cloud is based on
(i) a function g of shape similarity configured to provide weightage to non-planar local shapes compared to planar shapes; and
(ii) a function h of distance between the reference point cloud and the template point cloud configured to control acceleration and convergence of alignment for the rigid registration.

4. The processor implemented method of claim 1, wherein estimating rotation is based on Kabsch method.

5. The processor implemented method of claim 1, wherein obtaining total force, computing translation, estimating rotation, and estimaing scaling are iteratively performed for varying levels of resolution of the reference point cloud and the template point cloud based on a pyramidal approach.

6. A system comprising:
one or more data storage devices operatively coupled to one or more hardware processors and configured to store instructions configured for execution by the one or more hardware processors to:
capture a reference point cloud and a template point cloud; and
automatically perform rigid registration of the reference point cloud and the template point cloud by:
embedding a shape-based similarity constraint into a Gravitational Approach (GA), wherein curvature is used for representation of shape; and
iteratively performing:
obtaining total force applied on a point of the template point cloud by all points on the reference point cloud;
computing translation of the template point cloud based on the obtained total force to obtain new position of the template point cloud with respect to the reference point cloud;
estimating rotation required for the rigid registration based on the new position of each point of the template point cloud; and
estimating scaling required for the rigid registration based on a ratio of eigenvalues of co-variance matrices associated with the reference point cloud and the template point cloud.

7. The system of claim 6, wherein the one or more hardware processors are further configured to embed a shape-based similarity constraint into the Gravitational Approach (GA) by:
constraining force of attraction on each point of the template point cloud from each point of the reference point cloud with a measurement of local shape similarity;
modifying the force of attraction on each point of the template point cloud such that the modified force of attraction is directly proportional to a monotonically increasing function of distance therebetween; and
modifying the force of attraction on each point of the template point cloud such that the modified force of attraction is directly proportional to a function of shape similarity.

8. The system of claim 6, wherein the one or more hardware processors are further configured to obtain total force applied on a point of the template point cloud based on (i) a function g of shape similarity configured to provide weightage to non-planar local shapes compared to planar shapes; and
(ii) a function h of distance between the reference point cloud and the template point cloud configured to control acceleration and convergence of alignment for the rigid registration.

9. The system of claim 6, wherein the one or more hardware processors are further configured to estimate rotation required for the rigid registration based on Kabsch method.

10. The system of claim 6, wherein the one or more hardware processors are further configured to automatically perform the rigid registration iteratively based on a pyramidal approach.

11. A computer program product comprising a non-transitory computer readable medium having a computer readable program embodied therein, wherein the computer readable program, when executed on a computing device, causes the computing device to:
capture a reference point cloud and a template point cloud; and
automatically perform rigid registration of the reference point cloud and the template point cloud by:
embedding a shape-based similarity constraint into a Gravitational Approach (GA), wherein curvature is used for representation of shape;
iteratively performing:
obtaining total force applied on a point of the template point cloud by all points on the reference point cloud;
computing translation of the template point cloud based on the obtained total force to obtain new position of the template point cloud with respect to the reference point cloud;
estimating rotation required for the rigid registration based on the new position of each point of the template point cloud; and
estimating scaling required for the rigid registration based on a ratio of eigenvalues of co-variance matrices associated with the reference point cloud and the template point cloud.

12. The computer program product of claim 11, wherein the computer readable program further causes the computing device to perform embedding a shape-based similarity constraint into the GA by:
constraining force of attraction on each point of the template point cloud from each point of the reference point cloud with a measurement of local shape similarity;
modifying the force of attraction on each point of the template point cloud such that the modified force of attraction is directly proportional to a monotonically increasing function of di stance therebetween; and
modifying the force of attraction on each point of the template point cloud such that the modified force of attraction is directly proportional to a function of shape similarity.

13. The computer program product of claim 11, wherein the computer readable program further causes the computing device to perform obtaining total force applied on a point of the template point cloud based on (i) a function g of shape similarity configured to provide weightage to non-planar local shapes compared to planar shapes; and (ii) a function h of distance between the reference point cloud and the template point cloud configured to control acceleration and convergence of alignment for the rigid registration.

\* \* \* \* \*